(12) United States Patent
Mandai et al.

(10) Patent No.: US 6,410,094 B2
(45) Date of Patent: Jun. 25, 2002

(54) EXTRUSION COATING HEAD AND COATING METHOD FOR FLEXIBLE SUPPORT

(75) Inventors: Toshihiro Mandai; Norio Shibata, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/251,400

(22) Filed: Feb. 17, 1999

(30) Foreign Application Priority Data

Feb. 19, 1998 (JP) ............................................. 10-037600

(51) Int. Cl.[7] .............................. B05D 3/12; B05C 3/12
(52) U.S. Cl. ...................... 427/356; 118/410; 118/411; 425/466
(58) Field of Search ................................ 118/410, 411; 425/466; 427/356

(56) References Cited

U.S. PATENT DOCUMENTS

| | | | | |
|---|---|---|---|---|
| 4,984,533 A | * | 1/1991 | Takahashi et al. | ........... 118/419 |
| 5,425,967 A | * | 6/1995 | Tomaru | ........................ 427/356 |
| 5,464,577 A | * | 11/1995 | Leonard et al. | ............... 425/466 |

FOREIGN PATENT DOCUMENTS

| | | |
|---|---|---|
| JP | 60-238179 | 11/1985 |
| JP | 62-132566 | 6/1987 |
| JP | 2-56272 | 2/1990 |
| JP | 4-145977 | 5/1992 |
| JP | 5-293419 | 11/1993 |

\* cited by examiner

*Primary Examiner*—Katherine A. Bareford
(74) *Attorney, Agent, or Firm*—Sughrue Mion, PLLC

(57) ABSTRACT

An extrusion coating head comprises an upstream side block (12) and a downstream side block (13) aligned in the conveying direction, and adjusting mechanism. The upstream and downstream side blocks (12, 13) respectively have edge surfaces (12*a*, 13*a*) on which the flexible support (1) is pressed. The upstream and downstream side blocks (12, 13) define therebetween a slit (15*b*) through which a coating composition can be extruded and applied onto the flexible support. The adjusting mechanism adjusts a length (t) of a perpendicular line which is drawn from an upstream end (A) of the edge surface of the downstream side block to a tangential line (L) of the edge surface of the downstream side block which is drawn from a downstream end of the edge surface of the upstream side block, to thereby adjust a distribution of a coating thickness on the flexible support in the width direction.

16 Claims, 6 Drawing Sheets

EXTRUSION COATING HEAD AND COATING METHOD FOR FLEXIBLE SUPPORT

BACKGROUND OF THE INVENTION

1. Field of the Invention

The present invention relates to a method for applying a coating composition and particularly to a so-called extrusion coating method in which a leading end of a coating head is disposed so as to be opposite to a surface of a continuously conveying flexible support supported by conveying guide means such as guide rollers, etc. so that a coating composition extruded from a leading end of a slit of the coating head is applied onto the surface of the flexible support.

2. Description of the Related Art

Heretofore, a process for producing a photographic light-sensitive material, a magnetic recording medium, or the like, contains a step of applying a desired coating composition onto a flexible support. Various liquid compositions are used as the coating composition in accordance with purposes of use. Examples of the coating composition include coating compositions for a light-sensitive emulsion layer, an undercoat layer, a protection layer, a back layer, etc. in a photographic light-sensitive material, and coating compositions for a magnetic layer, an undercoat layer, a protection layer, a lubricant layer, etc. in a magnetic recording medium. Each of these coating compositions is an aqueous or organic solvent solution containing an essential component, a binder, and various additives if necessary.

Various methods such as a roller coating method, a gravure coating method, a roller coating and doctor coating method, an extrusion coating method, a slide coating method, etc. have been heretofore used as methods for applying the aforementioned coating composition onto a surface of a flexible support. The extrusion coating method is used popularly for application of a magnetic coating composition in recent years.

As known well, the extrusion coating method is a coating method in which a coating head having a slit is pressed against a continuously conveying flexible support so that a coating composition extruded from the slit in a doctor edge portion is applied thinly and uniformly onto a surface of the flexible support. Various discussions have been heretofore made upon the shape of the doctor edge portion, the pressure of the coating composition, the positional relation between the support and the leading end of the doctor edge, etc. as disclosed, for example, in Japanese Patent Unexamined Patent Publication No. Sho. 60-238179, Japanese Patent Unexamined Patent Publication No. Sho. 62-132566, Japanese Patent Unexamined Patent Publication No. Hei. 4-145977, etc.

The extrusion coating method has a problem in that the coating thickness becomes uneven in the direction of the width of the flexible support. This unevenness is established when the sum P of the pressure loss p1 in the passage of the coating composition through the slit and the pressure p2 generated on the doctor edge surface on the basis of pressing of the flexible support is uneven in the direction of the width of the support. When, for example, the slit gap or the shape of the doctor edge surface is uneven in producing accuracy or thickness irregularity, partial deformation (roughness), or the like, occurs in the direction of the width of the flexible support, unevenness of coating thickness occurs in the direction of the width of the support.

To solve this problem, coating apparatuses, or the like, each provided with adjusting means for adjusting slit gaps individually in the direction of the width of the support are proposed as disclosed in Japanese Patent Examined Patent Publication No. Hei. 7-106332 and Japanese Patent Unexamined Patent Publication No. Hei. 5-293419. In the proposed apparatuses, a distribution in the direction of the width of the support is given to the pressure loss in the passage of the coating composition through the slit to thereby improve the irregularity of coating thickness caused by the unevenness of the support.

On the other hand, as the trend of magnetic recording media in recent years, the thickness of a magnetic layer conducting recording has been reduced with the demand on high-density recording media. As the coating thickness decreases, more accurate thickness is required. Accordingly, the aforementioned thickness adjusting mechanism becomes essential.

However, when such an extrusion coating head is used for a flexible support having a high toughness, the pressure p2 generated on the doctor edge surface is higher than the pressure loss p1 in the slit. Accordingly, there arises a problem that the sum P of pressures does not change sufficiently even in the case where the pressure loss p1 is changed by use of the aforementioned adjustment means for adjusting the coating thickness in the direction of the width of the support. Furthermore, to widen the slit gap distribution more greatly, it is necessary to deform the coating head while exceeding the elastic deformation limit of the coating head material. This is undesirable for use.

SUMMARY OF THE INVENTION

An object of the present invention is to provide a coating method and an extrusion coating head for the same in which coating thickness can be adjusted in a small quantity of deformation within a range of the elastic deformation limit of the material of an extrusion coating head to solve the aforementioned problems in the prior art.

The above-mentioned object can be attained by an extrusion coating method, according to the present invention, comprising the steps of:

providing an extrusion coating head extending in a width direction perpendicular to a conveying direction of a continuously conveying flexible support and including an upstream side block and a downstream side block aligned in the conveying direction, in which the upstream and downstream side block respectively have edge surfaces on which the flexible support is pressed and the upstream and downstream side block define therebetween a slit through which a coating composition can be extruded and applied onto the flexible support; and adjusting a length (t) of a perpendicular line which is drawn from an upstream end (A) of the edge surface of the downstream side block to a tangential line (L) of the edge surface of the downstream side block which is drawn from a downstream end of the edge surface of the upstream side block, to thereby adjust a distribution of a coating thickness on the flexible support in the width direction.

In the above-mentioned extrusion coating method, it is preferable to further include the steps of:

adjusting a first length (t) of a perpendicular line which is located in a first plane which extends in the conveying direction; and adjusting a second length (t) of a perpendicular line which is located in a second plane which extends in the conveying direction, the second plane being different from the first plane, in which each of the first and second lengths is defined by a perpendicular line which is drawn from an upstream end (A) of the edge surface of the downstream side block to a tangential line (L) of the edge surface of the downstream side block which is drawn from a downstream end of the upstream side block, to thereby partially adjust a distribution of a coating thickness on the flexible support in the width direction.

In addition, in the above-mentioned extrusion coating method, it is preferable that the upstream side block is a back edge block and the downstream side block is a doctor edge block when the extrusion coating method is used for a coating method providing one layer on the flexible support.

Further, in the above-mentioned extrusion coating method, it is preferable that the upstream side block is a lower-layer-side doctor edge block and the downstream side block is an upper-layer-side doctor edge block when the extrusion coating method is used for a coating method providing multi-layers on the flexible support.

Moreover, in the above-mentioned extrusion coating method, it is preferable that the length adjusting step comprises the steps of:

inclining the downstream side block relative to the conveying direction in such a manner that an angle (θ) defined between the tangential line L and a center axis of the slit is not larger than 90°.

Furthermore, in the above-mentioned extrusion coating method, it is preferable that the length adjusting step comprises the steps of:

inclining the downstream side block relative to the conveying direction in such a manner that an angle (θ) defined between the tangential line L and a center axis of the slit is in the range of 45° to 80°.

In addition, the above-mentioned object can also be achieved by an extrusion coating head, according to the present invention, comprising:

an upstream side block and a downstream side block aligned in the conveying direction, in which the upstream and downstream side block respectively have edge surfaces on which the flexible support is pressed and the upstream and downstream side block define therebetween a slit through which a coating composition can be extruded and applied onto the flexible support; and an adjusting mechanism for adjusting a length (t) of a perpendicular line which is drawn from an upstream end (A) of the edge surface of the downstream side block to a tangential line (L) of the edge surface of the downstream side block which is drawn from a downstream end of the edge surface of the upstream side block.

In the above-mentioned extrusion coating head and method, it is preferable that the upstream side block is a back edge block and the downstream side block is a doctor edge block when the extrusion coating method is used for a coating method providing one-layer on the flexible support.

In the above-mentioned extrusion coating head and method, it is preferable that the upstream side block is a lower-layer-side doctor edge block and the downstream side block is an upper-layer-side doctor edge block when the extrusion coating method is used for a coating method providing multi-layers on the flexible support.

In the above-mentioned extrusion coating head, it is preferable that the length adjusting mechanism comprises:

an inclining means for inclining the downstream side block relative to the conveying direction.

In addition, in the above-mentioned extrusion coating head, it is preferable that the inclining means inclines the downstream side block in such a manner that an angle (θ) defined between the tangential line L and a center axis of the slit is not larger than 90°.

Further, in the above-mentioned extrusion coating head, it is preferable that the inclining means inclines the downstream side block in such a manner that an angle (θ) defined between the tangential line L and a center axis of the slit is in the range of 45° to 80°.

Furthermore, in the above-mentioned extrusion coating head, it is preferable to further include:

a plate member disposed under the downstream side block; and a flat plate interposed between the downstream side block and the plate member so as to allow the downstream side block to be elastically and partially deformed in the width direction, wherein the adjusting mechanism comprises a screw member for attaching the downstream side block to the plate member through the flat plate and simultaneously adjusting the elastically deforming condition of the downstream side block.

In the above-mentioned construction, it is advantageous that the plate member is shorter than the downstream side block in the width direction.

In the above-mentioned construction, it is advantageous that the adjusting mechanism comprises:

a plurality of adjusting members which are aligned in the width direction and each adjusts the length (t) in respective cross sections.

In the above-mentioned construction, it is advantageous that the adjusting member comprises:

L-shaped plate having a plurality of holes aligned in the width direction, and a plurality of screws threadely engaged with respective holes of said L-shaped plate.

Note that, although the length t may be off-line adjusted, the length t can be on-line adjusted if the coating head is provided with adjusting mechanisms.

DETAILED DESCRIPTION OF THE PREFERRED EMBODIMENT

Figure 1:
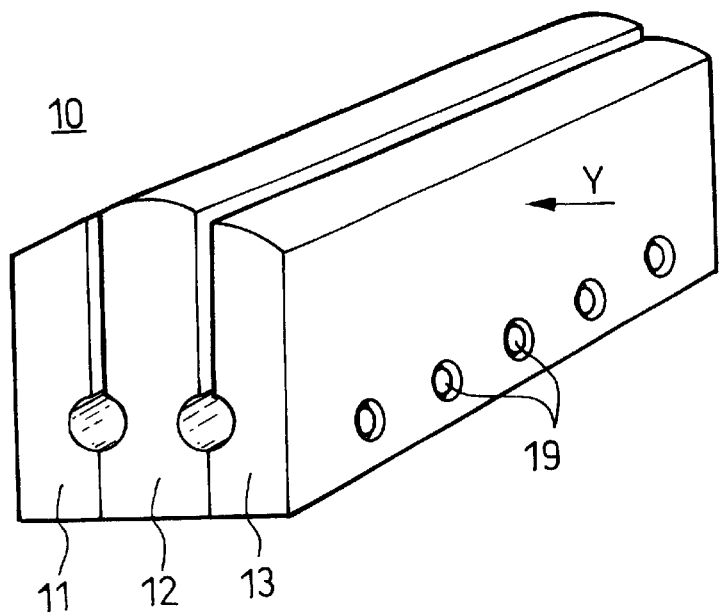
FIG. 1 is a perspective view showing the schematic configuration of a 2-layer multicoating type coating head in a coating apparatus according to an embodiment of the present invention.
Figure 2:
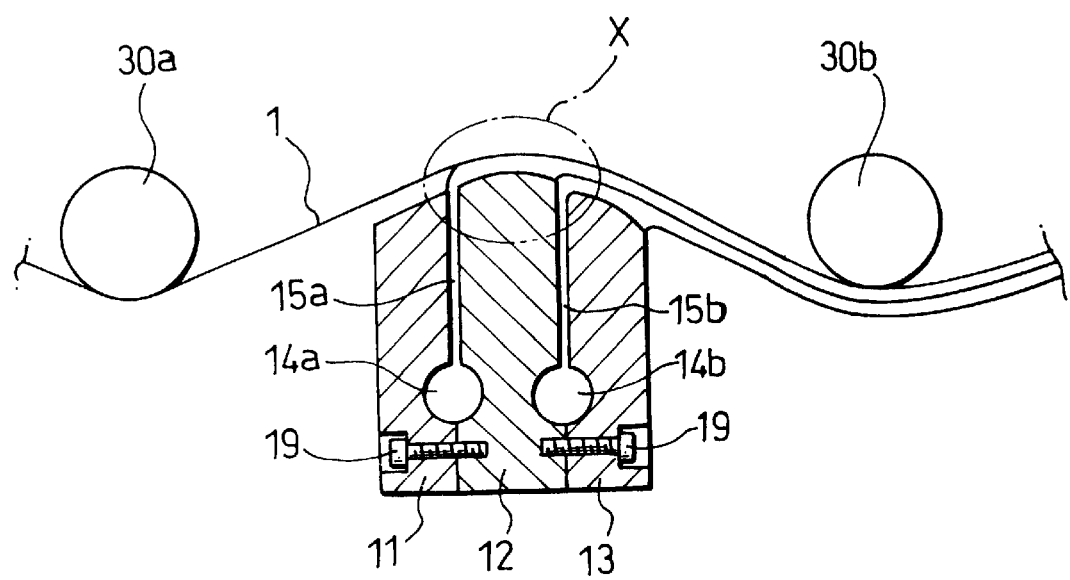
FIG. 2 is a sectional view of the coating head depicted in FIG. 1.
Figure 3:
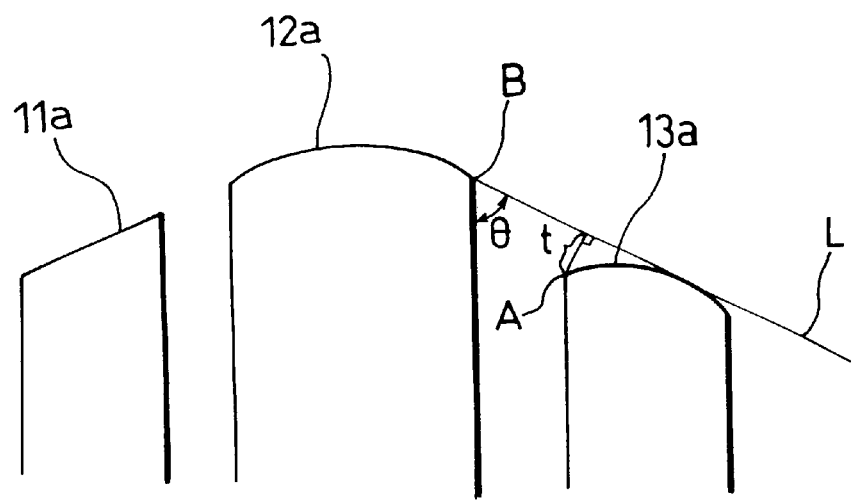
FIG. 3 is an enlarged view of the portion X of the coating head depicted in FIG. 2 for explaining the principle of the present invention.

A coating apparatus according to an embodiment of the present invention will be described below with reference to FIGS. 1 through 8. FIGS. 1 and 2 are a perspective view and a sectional view, respectively, showing the schematic configuration of a 2-layer multicoating type coating head in a coating apparatus in this embodiment, and FIG. 3 is an enlarged view of the portion X of the coating head depicted in FIG. 2.

In the coating apparatus in this embodiment, a flexible support (hereinafter simply referred to as "support") 1 is pressed against a coating head 10 by guide rollers 30a and 30b provided in upstream and downstream sides respectively so that coating compositions extruded from slits which will be described later are applied uniformly onto the support 1.

The configuration of the coating head 10 will be described below. In the coating head 10, an first block 11, a second block 12 and a third block 13, in the descending stream order with respect to the direction S of the movement of the support 1, are connected to one another by screws 19. In this embodiment, the first block 11 is a back edge block, the second block 12 is a lower-layer-side edge block, and the third block 13 is an upper-layer-side edge block. In this embodiment, the upstream-side block according to the present invention is corresponds to the second block 12, as the lower-layer-side edge block. Then the downstream-side block according to the present invention is corresponds to the third block 13, as the upper-layer side edge block. Pockets 14a and 14b and slits 15a and 15b are formed in joint surfaces of the blocks. Coating compositions are fed into the pockets respectively by feed means such as pumps, or the like, which are not shown but provided in the outside for feeding the coating compositions quantitatively and continuously. The coating compositions are extruded toward the support 1 through the slits which are continued from the pockets respectively.

Further, a back edge surface 11a, a lower-layer-side doctor edge surface 12a and an upper-layer-side doctor edge surface 13a, in the descending stream order, are formed in leading end portions of the blocks 11 to 13 respectively. The back edge surface 11a has a length (along the direction of conveying of the support 1) of from 0.1 to 30 mm and may be shaped like a flat surface or a circular arc surface having a certain curvature radius in cross sectional view. Further, each of the doctor edge surfaces 12a and 13a has a length of from 0.5 to 20 mm and may be shaped like a circular arc surface having a certain curvature radius or like a combination of a circular arc surface and a flat surface in cross sectional view. The curvature radius R can be changed suitably in accordance with the conveying speed of the support, the stiffness of the support and the desired coating thickness. Generally, the preferred curvature radius R is from about 0.5 to about 20 mm.

As shown in FIG. 3, let the length of a perpendicular drawn from A to L be t when A represents an upstream edge of the upper-layer-side doctor edge surface 13a and L represents a tangential line drawn from a downstream end B of the lower-layer-side doctor edge surface 12a located in the upstream side of the upper-layer-side doctor edge surface 13a to the upper-layer-side doctor edge surface 13a.

As described above, the coating apparatus in this embodiment is characterized in that the length t in the coating head 10 is adjusted in the direction of the width of the support 1 to thereby adjust the coating thickness.

The adjusting method will be described below.

The three blocks 11 to 13 can be slid in joint surfaces thereof so that the three blocks 11 to 13 have suitable height relations with one another. Furthermore, the three blocks 11 to 13 are configured such that the height of each block can be changed partially in the direction of the width of the support 1.

Figure 4:
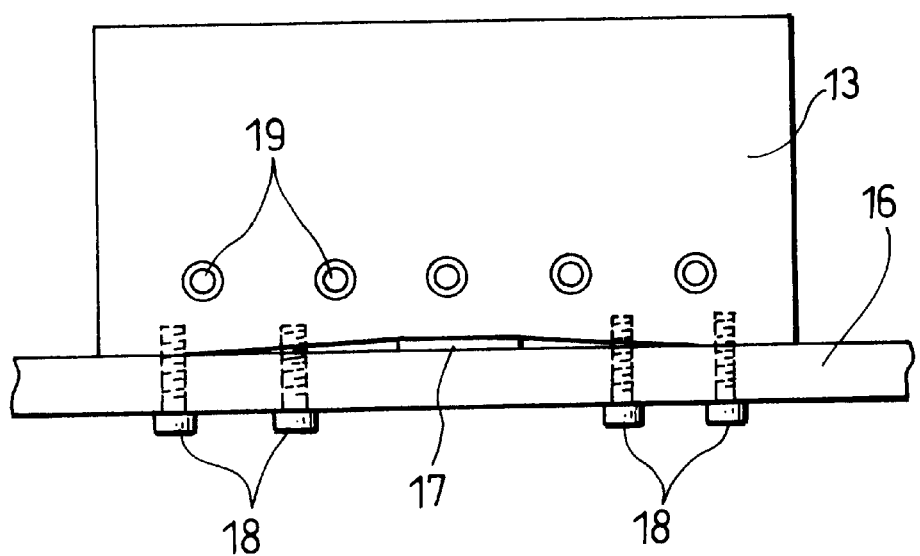
FIG. 4 is a view taken in the direction of the arrow Y in FIG. 1 for explaining a method for adjusting the height of each block partially in the direction of the width of the coating head.

For example, as shown in FIG. 4 (which is a view taken in the direction of the arrow Y in FIG. 1), the three blocks are put on an accurate flat plate 16 and a plate material 17 different in its thickness is interposed between the third block 13 and the flat plate 16. The lower surface of the third block 13 in this condition is tightened or pulled by screws 19, or the like, from the lower portion of the flat plate 16 to thereby deform the third block 13 elastically. When the joint screws 19 for the blocks are tightened in this condition, the length t can be set to have a desired distribution in the direction of the width of the support 1.

In the case where a partially thicker upper layer portion is generated in the coating composition because of the unevenness of accuracy of the coating head 10 or the unevenness of stiffness of the support, a portion of the third block 13 corresponding to the partially thicker portion is lifted up by the aforementioned method to reduce the length t so as to increase the pressure p2 generated on the upper-layer-side doctor edge surface 13a, then the thickness of the upper layer can be reduced correspondingly. On the contrary, in the case where only a certain portion is thinner in the upper layer, the upper layer can be thickened by an operation reverse to the aforementioned operation.

As described above, the length t can be on-line adjusted when the coating head is provided with adjusting mechanisms.

Although it is conceivable that the specific mechanism for adjusting the length t in the coating head 10 is formed variously, a method will be described below in which a side surface of the third block 13 is formed obliquely to thereby adjust the length t.

Figure 5:
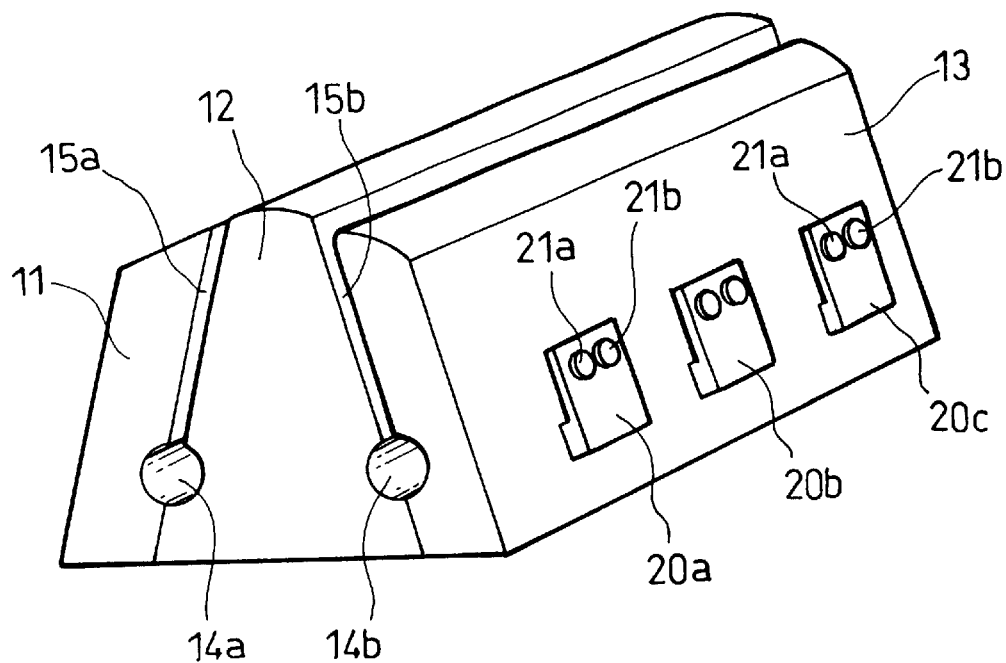
FIG. 5 is a perspective view showing an example of an adjusting mechanism.

FIG. 5 shows an example of the adjusting mechanism. In the configuration shown in this example, the axial direction of the upper layer side slit 15b formed between the second block 12 and the third block 13 is set so that the angle θ between the axial direction of the slit 15b and the tangential line L drawn from the downstream end B of the lower-layer-side doctor edge surface 12a to the upper-layer-side doctor edge surface 13a is not larger than 90°, preferably in a range of from 45° to 80°.

The slit length LS from the pocket 14b to the outlet of the slit 15b is preferably set to be not smaller than 40 mm so that the slit length LS is used as a runway for the coating composition.

Figure 6:
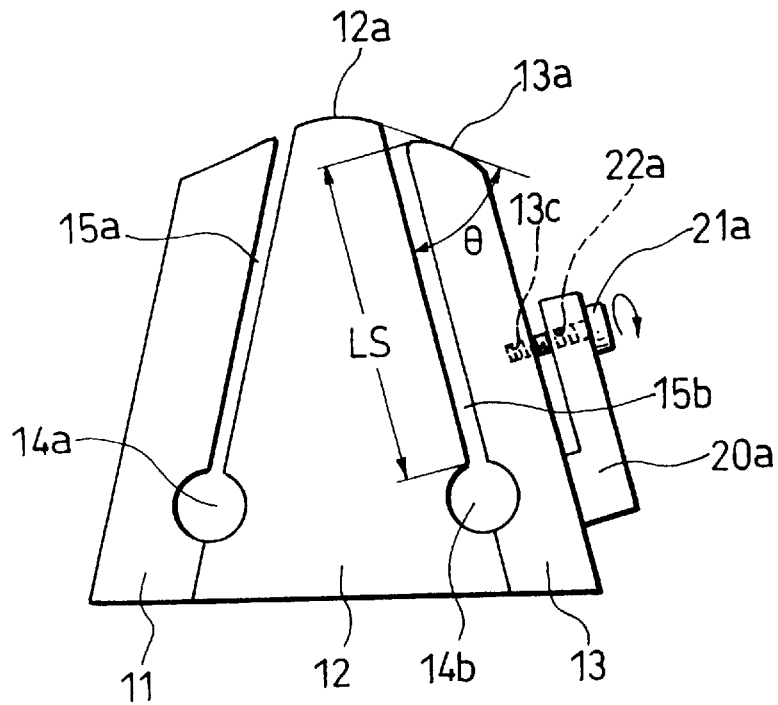
FIG. 6 is a view for explaining the specific operation of the adjusting mechanism depicted in FIG. 5.
Figure 7:
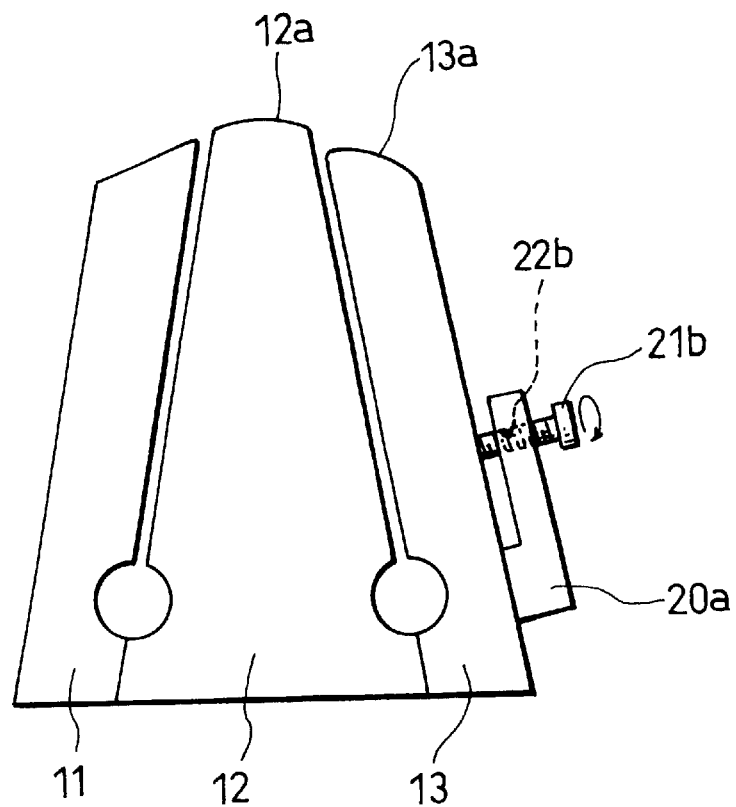
FIG. 7 is a view for explaining the specific operation of the adjusting mechanism depicted in FIG. 5.

A plurality of L-shaped members 20a to 20c are provided on an outer wall surface 13b of the third block 13 so as to be arranged in the direction of the width of the support 1. Each of the L-shaped members 20a to 20c has two adjustment screws 21a and 21b which are adjusting members. As shown in FIG. 6, one of the adjustment screws 21a is tightened, via a through-hole 22a formed in each of the L-shaped members 20a to 20c, into a tap hole 13c formed in the wall surface of the third block 13.

When the adjustment screw 21a is tightened, the third block 13 is deformed elastically in the direction to widen the slit 15b with the pocket 14b substantially as a center. At the same time, the upstream end A of the upper-layer-side doctor edge surface 13a moves so that the length t is reduced, which distance is between the tangential line drawn from B to the upper-layer-side doctor edge surface 13a and the upstream end A of the upper-layer-side doctor edge surface 13a. The other adjustment screw 21b as an adjustment member abuts on the wall surface of the third block 13 via a tap through-hole 22b formed in each of the L-shaped members 20a to 20c. When the adjustment screw 21b is tightened, the third block 13 is deformed elastically to narrow the slit 15b with the pocket 14b substantially as a center and, at the same time, the downstream end A of the upper-layer-side doctor edge surface 12a moves to increase the length t so that the thickness of the coating composition can be increased partially.

Figure 8:
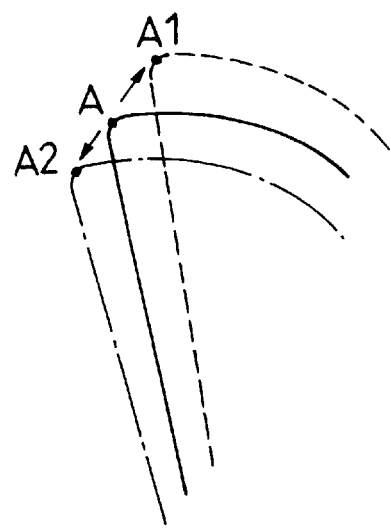
FIG. 8 is a view for explaining the specific operation of the adjusting mechanism depicted in FIG. 5.

The operation of changing the length t will be described below in detail with reference to FIG. 8.

As described above, the angle θ between the axial line of the slit and the tangential line L drawn from the downstream end B of the lower-layer-side doctor edge surface 12a to the upper-layer-side doctor edge surface 13a is set to be in a range of from 45° to 80°. Accordingly, when the adjustment screw 21a is tightened, the upstream end A of the upper-layer-side doctor edge surface 13a of the third block 13 moves to A1 as represented by the broken line in FIG. 8. When the adjustment screw 21b is tightened, the upstream end A moves to A2 as represented by the alternate long and short dash line in FIG. 8.

Further, the change of the length t caused by tightening of the adjustment screws 21a and 21b increases as the angle θ approaches 45°.

However, under the condition that the pressure p2 generated on the upper-layer-side doctor edge surface 13a is insufficiently larger than the pressure loss p1 in the slit 15b, the influence of the change of the pressure loss in the slit 15b may become large so that the change of the thickness may appear reversely.

A specific embodiment of the present invention will be described below.

Components shown in each of Tables 1 and 2 were put into a ball mill and mixed and dispersed sufficiently. Then, 30 parts by weight of an epoxy resin were added to each of the resulting mixtures and mixed sufficiently. The mixtures thus prepared were used as coating compositions to be applied onto a support 1.

TABLE 1

| UPPER LAYER COATING COMPOSITION | |
|---|---|
| Fe/Zn/Ni powder | 300 parts by weight |
| vinyl chloride-vinyl acetate copolymer | 30 |
| electrically conductive carbon | 20 |
| polyamide resin | 15 |
| lecithin | 6 |
| cyclohexane | 300 |
| methyl ethyl ketone | 300 |
| n-butanol | 100 |

TABLE 2

| LOWER LAYER COATING COMPOSITION | |
|---|---|
| TiO₂ powder | 300 parts by weight |
| vinyl chloride-vinyl acetate copolymer | 30 |
| electrically conductive carbon | 20 |
| polyamide resin | 15 |

TABLE 2-continued

| LOWER LAYER COATING COMPOSITION | |
|---|---|
| lecithin | 6 |
| cyclohexane | 500 |
| n-butanol | 100 |

Other coating conditions were as follows.

| Flexible support | PET film | thickness: 75 μm width: 1000 mm |
|---|---|---|
| Coating speed | 200 m/min | |
| Coating thickness (dry) | | upper layer: 0.4 μm lower layer: 1.5 μm |
| Shape of extrusion coating head | | |
| curvature radius of lower-layer-side doctor edge surface: | | 4 mm |
| curvature radius of upper-layer-side doctor edge surface: | | 6 mm |
| lower-layer-side slit gap: | | 0.15 mm |
| upper-layer-side slit gap: | | 0.15 mm |

The length t in the upper-layer-side doctor edge surface 13a was set to 5 μm. Ten thickness adjusting mechanisms were provided substantially at regular intervals of a pitch in the direction of the width of the support.

Figure 9A:
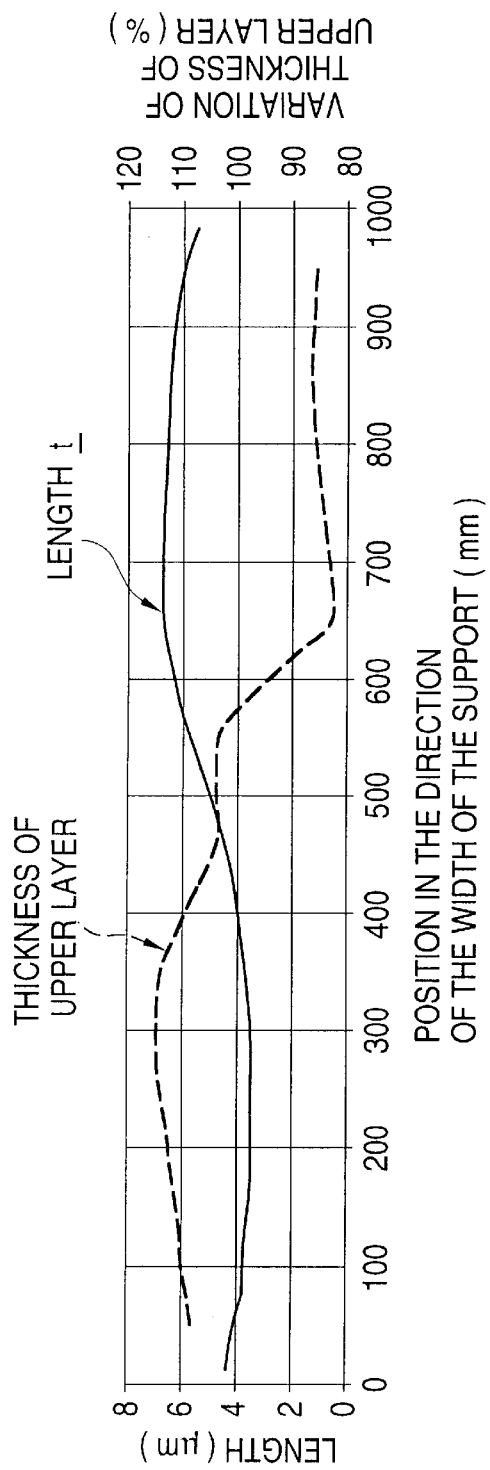
FIGS. 9a and 9b are graphs showing the relation between the length t and the thickness of the upper layer in this embodiment.
Figure 9B:
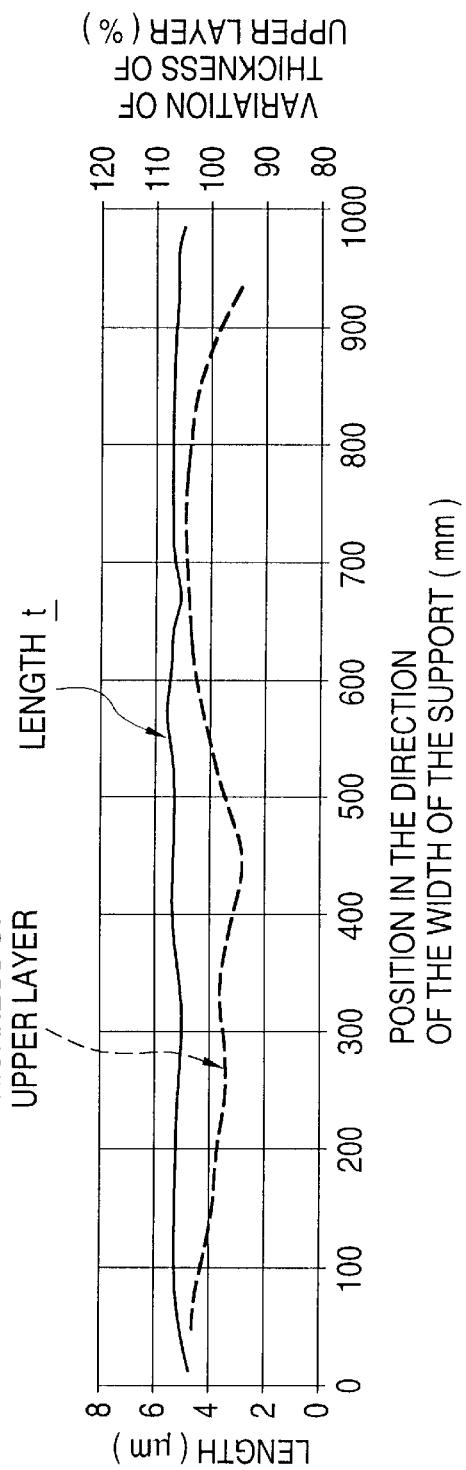

While the adjusting mechanisms were operated in the aforementioned condition, the relation between the length t and the thickness of the upper layer was examined. Results of the examination were as shown in FIGS. 9a and 9b.

Thus, by changing the length t in the widthwise direction by means of the adjustment mechanisms, the coating thickness can be desirably changed to thereby obtain a uniform thickness distribution.

Although the aforementioned embodiment of the present invention has been taken as an example, it is a matter of course that the present invention is not limited thereto.

For example, the aforementioned adjusting mechanisms show only one example, so that any mechanism may be used so long as the mechanism can change the length t.

Although the aforementioned embodiment has shown the case of 2-layer simultaneous coating as an example, the coating method according to the present invention can be applied also to the case of 1-layer coating and to the case of multilayer simultaneous coating.

Figure 10A:
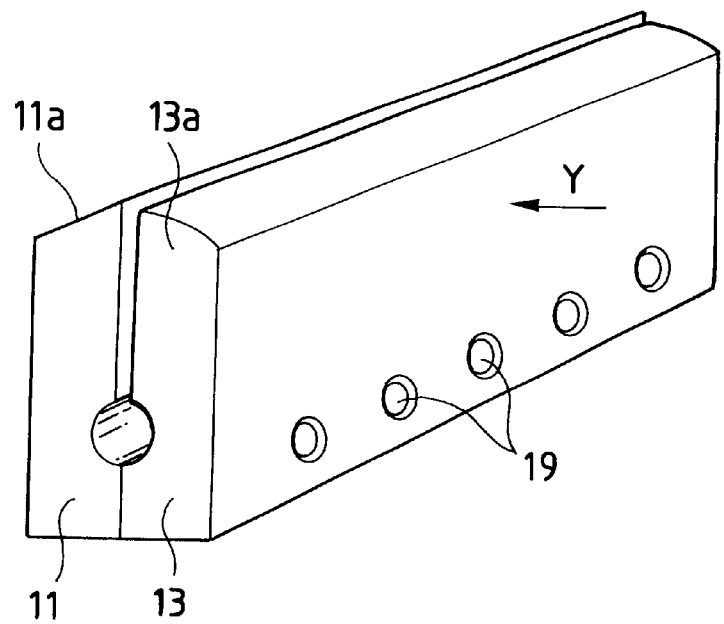
FIGS. 10a and 10b respectively show a modification of the coating head according to the present invention.
Figure 10B:
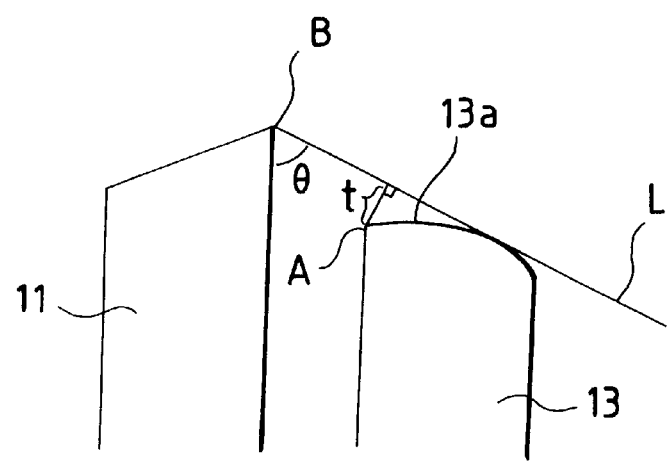

As clearly shown in FIGS. 10a and 10b, when the coating head for one-layer is utilized, the upstream side block and the downstream side block are respectively directed to a back edge block and a doctor edge block. The other construction and explanation as to the length (t) are the same as the above-mentioned embodiment using the coating head or method of two-layer coating type which is shown in FIGS. 1–8, detailed explanation of the modification is refrained by using the same reference numerals in FIGS. 10a and 10 b.

Further note that the present invention is also applicable to a coating head or method in which three or more layers are coated on the flexible support. At that time, the upstream side block is a lower-layer-side doctor edge block, and the downstream side block is an upper-layer-side doctor edge block. As described above in detail, according to the present invention, a remarkable effect can be achieved in a coating method. The method according to the present invention is effective in coating with a uniform thickness even in the case where unevenness in the thickness of coated layers is inevitable because of factors other than a coating method itself, for example, unevenness in the shape of slit gap or doctor edge surface, irregular thickness of the support or partial deformation of the support, or the like.

What is claimed is:

1. An extrusion coating method comprising the steps of:
providing an extrusion coating head extending in a width direction perpendicular to a conveying direction of a continuously conveying flexible support and including an upstream side block and a downstream side block aligned in the conveying direction, in which the upstream side block and the downstream side block respectively have edge surfaces on which the flexible support is pressed and the upstream and downstream side blocks define therebetween a slit through which a coating composition is extruding and applied onto the flexible support;

providing a pair of tension rollers for pressing the flexible support toward the upstream side block and the downstream side block such as to generate a pressure p2 on a doctor edge surface based on the pressing of the flexible support; and adjusting, independently and at discrete locations along the width direction, a length (t) of a perpendicular line which is drawn from an upstream end (A) of the edge surface of the downstream side block to a tangential line (L) of the edge surface of the downstream side block which is drawn from a downstream end of the edge surface of the upstream side block, so that when the length (t) is adjusted the sum P of a pressure loss p1 during passage of the coating composition through the slit and the pressure p2 becomes uniform in the width direction of the support, to partially adjust a coating thickness to obtain a uniform thickness distribution while applying the coating composition on the flexible support in the width direction.

2. An extrusion coating method according to claim 1, in which the adjusting step further comprising the steps of:
adjusting a first length (t) of a perpendicular line which is located in a first plane which extends in the conveying direction; and adjusting a second length (t) of a prependicular line which is located in a second plane which extends in the conveying direction, the second plane being spaced apart from the first plane in the width direction, in which each of the first and second lengths is defined by a perpendicular line which is drawn from an upstream end (A) of the edge surface of the downstream side block to a tangential line (L) of the edge surface of the downstream side block which is drawn from a downstream end of the upstream side block, to thereby partially adjust a distribution of a coating thickness on the flexible support in the width direction.

3. An extrusion coating method according to claim 1, in which the upstream side block is a back edge block and the downstream side block is a doctor edge block.

4. An extrusion coating method according to claim 1, in which the upstream side block is a lower-layer-side doctor edge block and the downstream side block is an upper-layer-side doctor edge block.

5. An extrusion coating method according to claim 1, in which the length adjusting step comprises the steps of:
inclining the downstream side block relative to the conveying direction in such a manner that an angle (θ) defined between the tangential line L and a center axis of the slit is not larger than 90°.

6. An extrusion coating method according to claim 1, in which the length adjusting step comprises the steps of:
inclining the downstream side block relative to the conveying direction in such a manner that an angle (θ) defined between the tangential line L and a center axis of the slit is in the range of 45° to 80°.

7. A coating apparatus comprising:
an extrusion coating head with an upstream side block and a downstream side block operative to be aligned in a conveying direction of a continuously conveying flexible support, in which the upstream side block and the downstream side block respectively have edge surfaces, at least one of which is a doctor edge surface, on which the flexible support is pressed and the upstream and downstream side blocks define therebetween a slit through which a coating composition can be extruded and applied onto the flexible support;

a pair of tension rollers respectively disposed on upstream and downstream sides of the extrusion coating head for pressing the flexible support toward the extrusion coating head such as to generate a pressure p2 on the doctor edge surface based on the pressing of the flexible support; and an adjusting mechanism disposed on the extrusion coating head for adjusting, independently and at discrete locations along said extrusion coating head in a width direction of the flexible support, a length (t) of a perpendicular line which is drawn from an upstream end (A) of the edge surface of the downstream side block to a tangential line (L) of the edge surface of the downstream side block which is drawn from a downstream end of the edge surface of the upstream side block, so that when the length (t) is adjusted the sum P of a pressure loss p1 during passage of the coating composition through the slit and the pressure p2 becomes uniform in the width direction of the support, to partially adjust a coating thickness to obtain a uniform thickness distribution while applying the coating composition on the flexible support in the width direction.

8. A coating apparatus according to claim 7, in which the upstream side block is a back edge block and the downstream side block is a doctor edge block.

9. A coating apparatus according to claim 7, in which the upstream side block is a lower-layer-side doctor edge block and the downstream side block is an upper-layer-side doctor edge block.

10. A coating apparatus according to claim 9, in which the length adjusting mechanism comprises:
an inclining means for inclining the downstream side block relative to the conveying direction.

11. A coating apparatus comprising:
an extrusion coating head with an upstream side block and a downstream side block operative to be aligned in a conveying direction of a continuously conveying flexible support, in which the upstream side block and the downstream side block respectively have edge surfaces, at least one of which is a doctor edge surface, on which the flexible support is pressed and the upstream and downstream side blocks define therebetween a slit through which a coating composition can extruded and applied onto the flexible support;

a pair of tension rollers respectively disposed on upstream and downstream sides of the extrusion coating head for pressing the flexible support toward the extrusion coating head such as to generate a pressure p2 on the doctor edge surface based on the pressing of the flexible support; and an adjusting mechanism disposed on the extrusion coating head for adjusting, independently and at discrete locations along said extrusion coating head in a width direction of the flexible support, a length (t) of a perpendicular line which is drawn from an upstream end (A) of the edge surface of the downstream side block to a tangential line (L) of the edge surface of the downstream side block which is drawn from a downstream end of the edge surface of the upstream side block, wherein the pressure p2 generated on the doctor edge surface based on the pressing of the flexible support is higher than a pressure loss p1 during passage of the coating composition through the slit, so that when the length (t) is adjusted the sum P of the pressure loss p1 and the pressure p2 becomes uniform in the width direction of the support, to partially adjust a coating thickness to obtain a uniform thickness distribution while applying the coating composition on the flexible support in the width direction, wherein said adjusting mechanism comprises a plurality of L-shaped, adjusting plates attached to a wall surface of said downstream side block and aligned in the width direction.

12. A coating apparatus comprising:

an extrusion coating head with an upstream side block and a downstream side block operative to be aligned in a conveying direction of a continuously flexible support, in which the upstream side block and the downstream side block respectively have edge surfaces, at least one of which is a doctor edge surface, on which the flexible support is pressed and the upstream and downstream side blocks define therebetween a slit through which a coating composition can be extruded and applied onto the flexible support;

a pair of tension rollers respectively disposed on upstream and downstream sides of the extrusion coating held for pressing the flexible support toward the extrusion coating head such as to generate a pressure p2 on the doctor edge surface based on the pressing of the flexible support; and an adjusting mechanism disposed on the extrusion coating head for adjusting, independently and at discrete locations along said extrusion coating head in a width direction of the flexible support, a length (t) of a perpendicular line which is drawn from an upstream end (A) of the edge surface of the downstream side block to a tangential line (L) of the edge surface of the downstream side block which is drawn from a downstream end of the edge surface of the upstream side block, so that when the length (t) is adjusted the sum P of a pressure loss p1 during passage of the coating composition through the slit and the pressure p2 becomes uniform in the width direction of the support, to partially adjust a coating thickness to obtain a uniform thickness distribution while applying the coating composition on the flexible support in the width direction, wherein the upstream side block is a lower-layer-side doctor edge block and the downstream side block is an upper-layer-side doctor edge block, wherein the length adjusting mechanism comprises:

an inclining means for inclining the downstream side block relative to the conveying direction, and wherein the inclining means inclines the downstream side block in such a manner that an angle (θ) defined between the tangential line L and a center axis of the slit is in the range of 45° to 80°.

13. A coating apparatus according to claim 12, in which the adjusting mechanism comprises:

a plurality of adjusting members (20a, 20b, 20c) which are aligned in the width direction and each adjusts the length (t) in respective cross sections.

14. A coating apparatus according to claim 13, in which the adjusting member comprises:

an L-shaped plate having a plurality of holes aligned in the width direction, and a plurality of screws threadedly engaged with respective holes of said L-shaped plate.

15. A coating apparatus according to claim 14, in which said L-shaped plate is attached to a wall surface of said downstream side block.

16. A coating apparatus comprising:

an extrusion coating head with an upstream side block and a downstream side block operative to be aligned in a conveying direction of a continuously conveying flexible support, in which the upstream side block and the downstream side block respectively have edge surfaces, at least one of which is a doctor edge surface, on which the flexible support is pressed and the upstream and downstream side blocks define therebetween a slit through which a coating composition can be extruded and applied onto the flexible support;

a pair of tension rollers respectively disposed on upstream and downstream sides of the extrusion coating head for pressing the flexible support toward the extrusion coating head such as to generate a pressure p2 on the doctor edge surface based on the pressing of the flexible support;

an adjusting mechanism disposed on the extrusion coating head for adjusting, independently and at discrete locations along said extrusion coating head in a width direction of the flexible support, a length (t) of a perpendicular line which is drawn from an upstream end (A) of the edge surface of the downstream side block to a tangential line (L) of the edge surface of the downstream side block which is drawn from a downstream end of the edge surface of the upstream side block, so that when the length (t) is adjusted a sum P of a pressure loss p1 during passage of the coating composition through the slit and the pressure p2 becomes uniform in the width direction of the support, to partially adjust a coating thickness to obtain a uniform thickness distribution while applying the coating composition on the flexible support in the width direction;

a flat plate member disposed under the downstream side block, the flat plate member being shorter than the downstream side block in the width direction; and a plate material interposed between the downstream side block and the flat plate member so as to allow the downstream side block to be elastically and partially deformed in the width direction, wherein the adjusting mechanism comprises a screw member for attaching the downstream side block to the flat plate member through the plate material and simultaneously adjusting the elastically deforming condition of the downstream side block.

* * * * *